Jan. 21, 1941. C. P. GALANOT 2,229,561
HYDRAULIC APPARATUS FOR MOTOR VEHICLES
Filed July 14, 1938 8 Sheets-Sheet 1
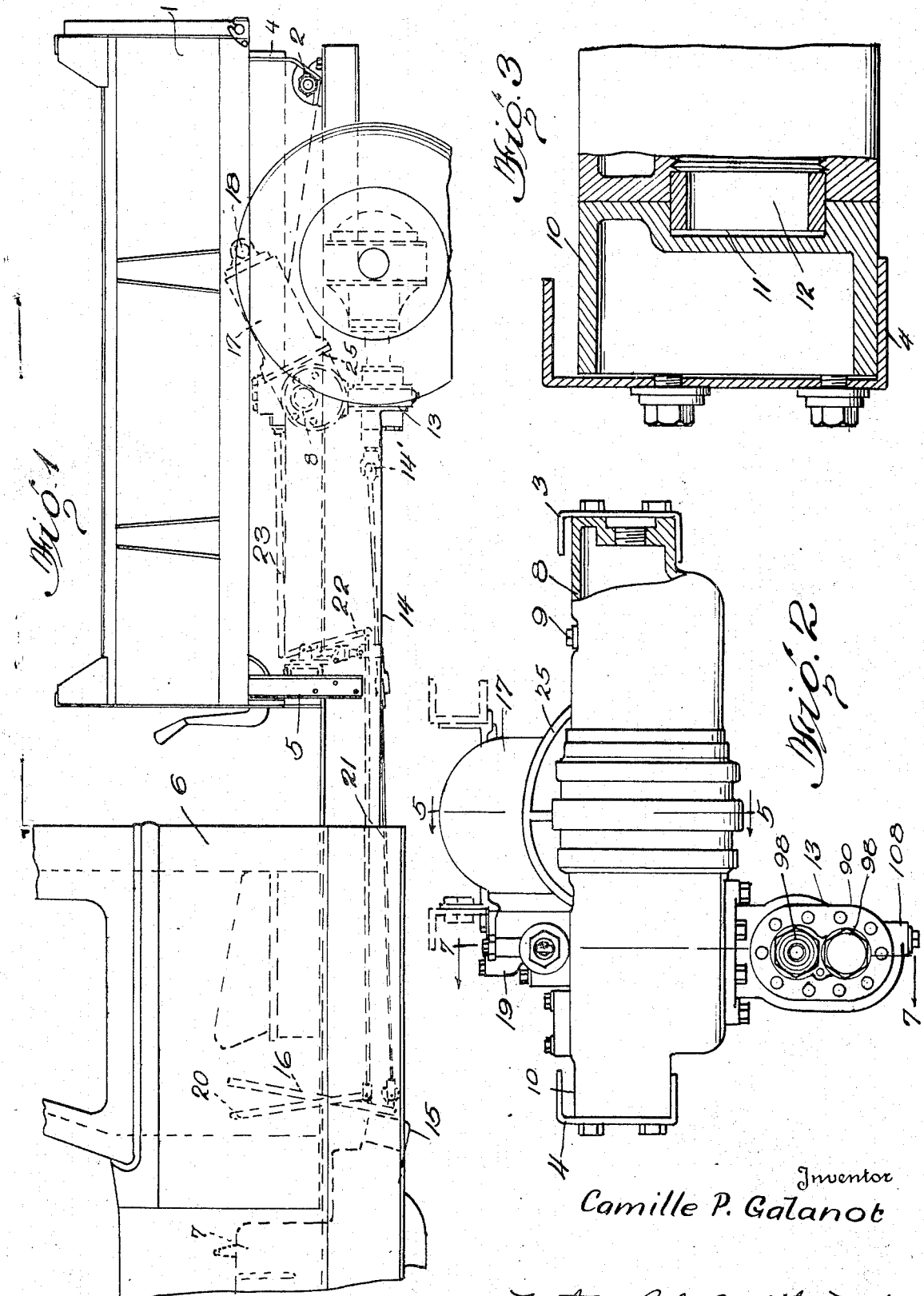
Inventor
Camille P. Galanot
By Watson Cole Grindle & Watson
Attorneys

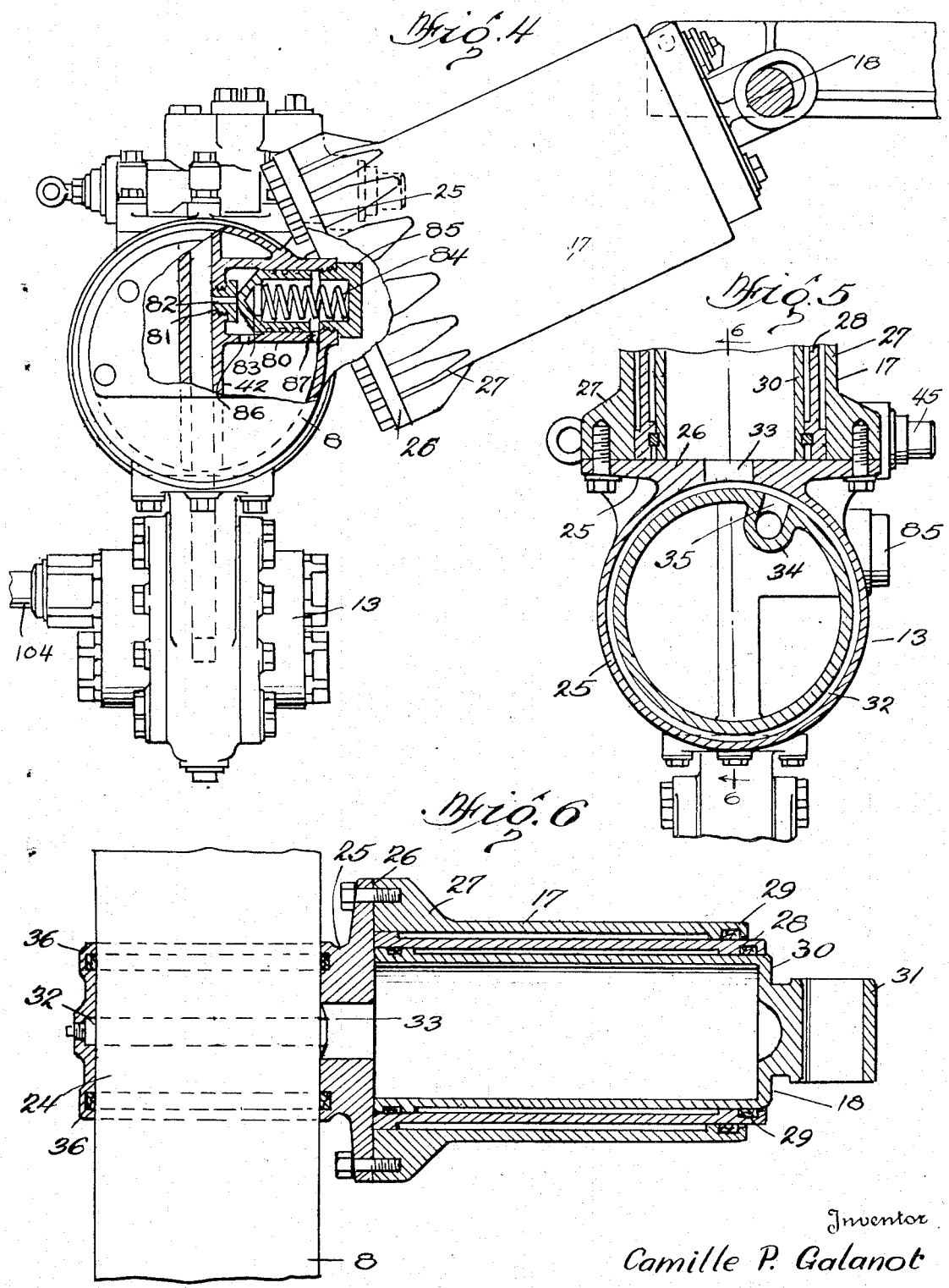

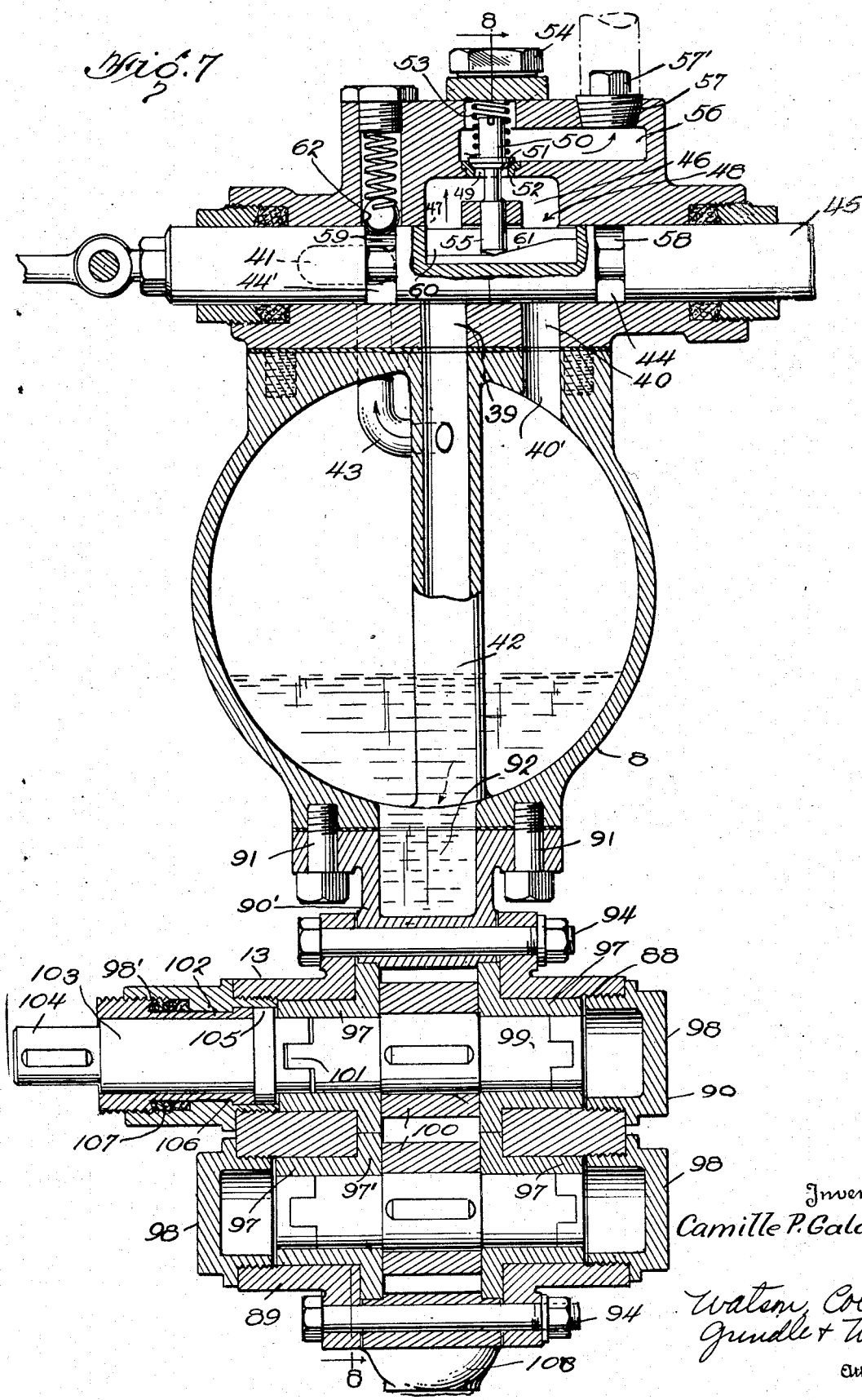

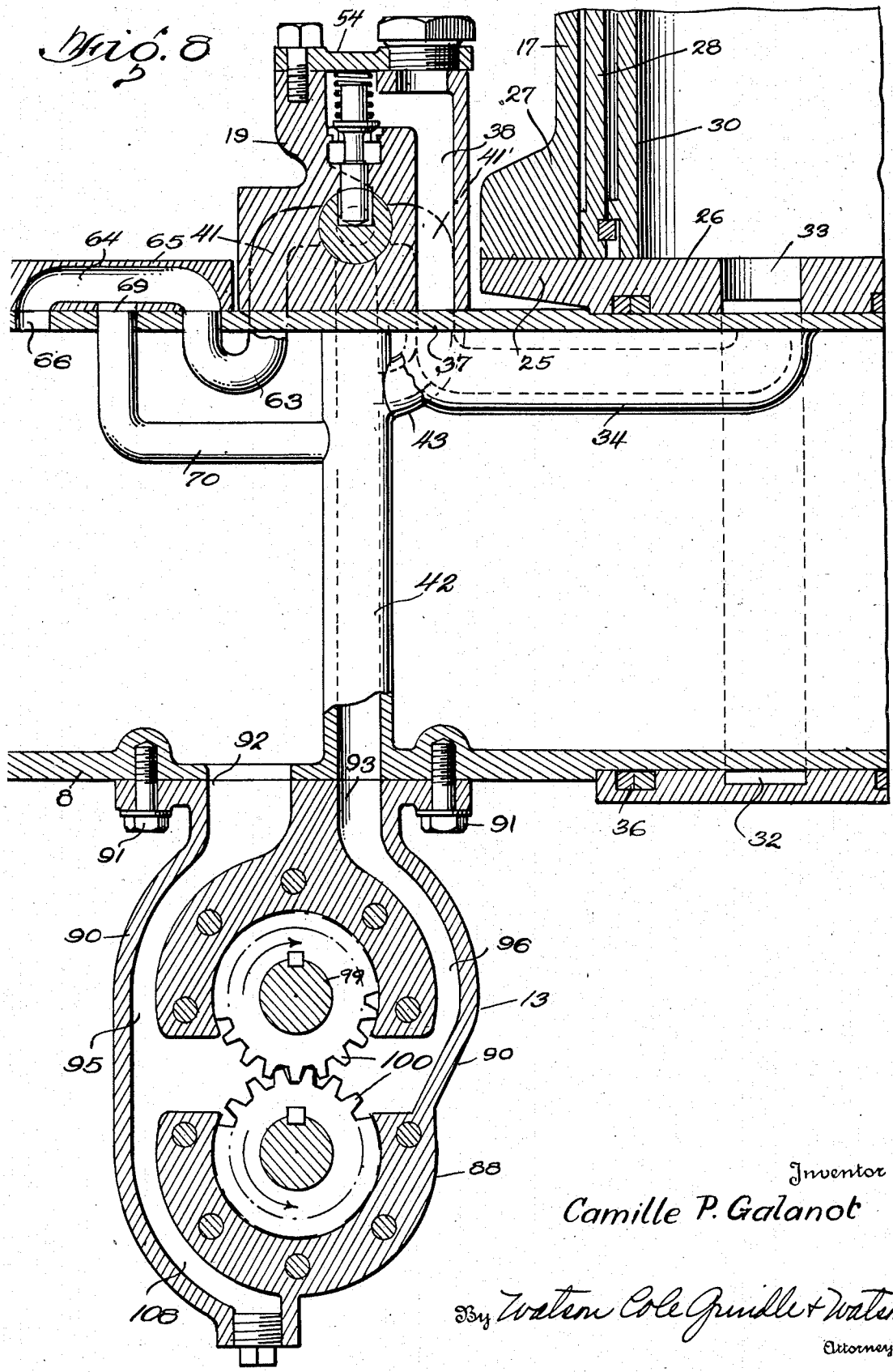

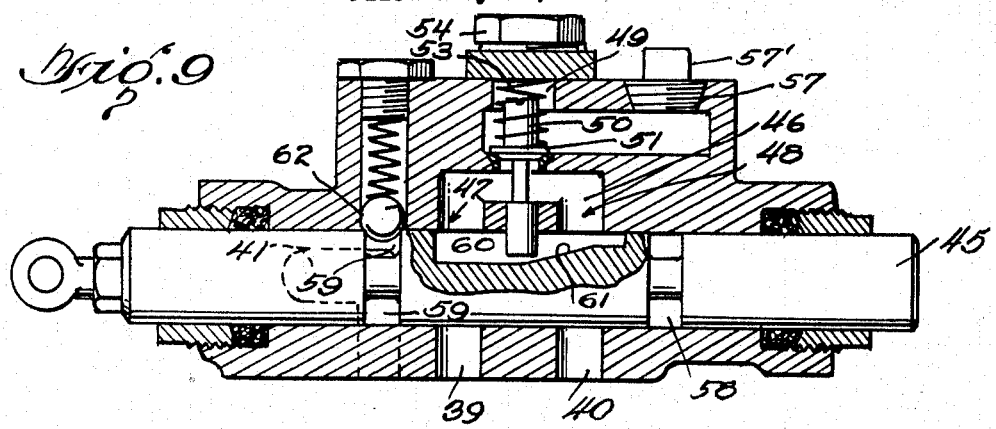
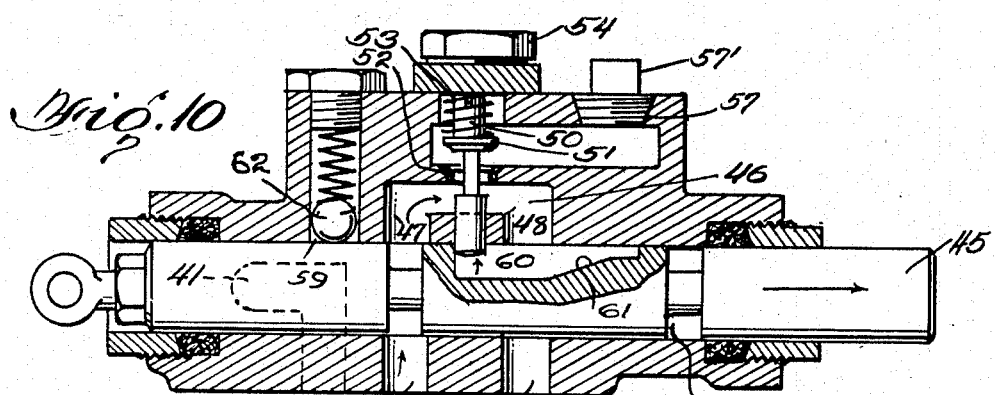
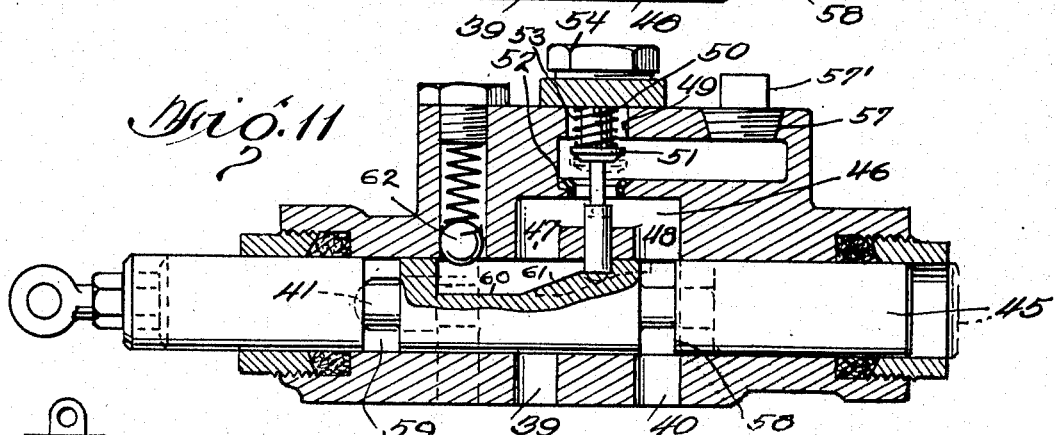
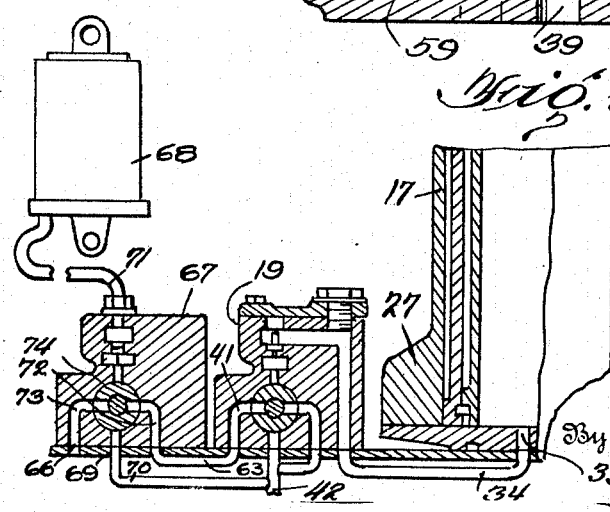

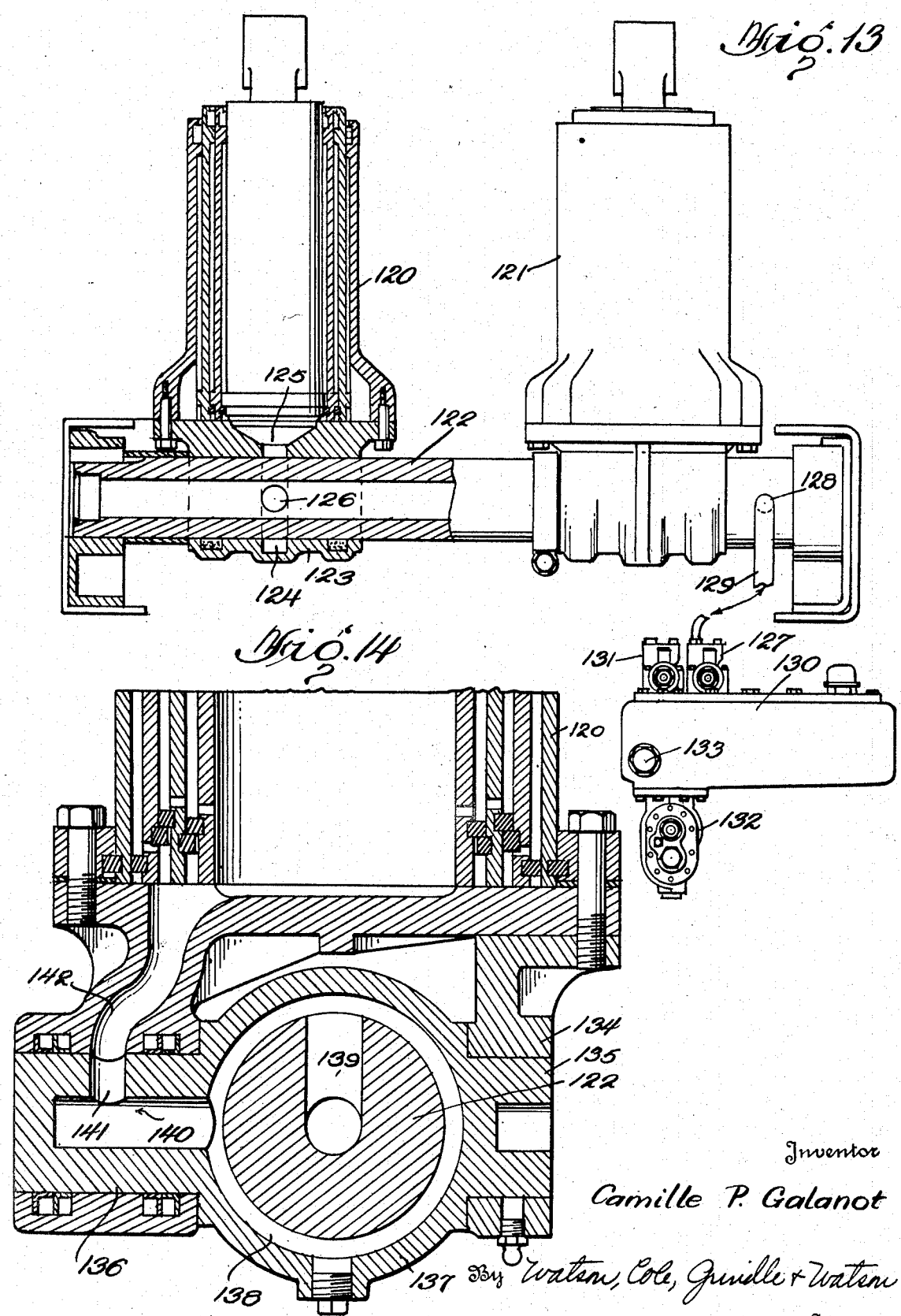

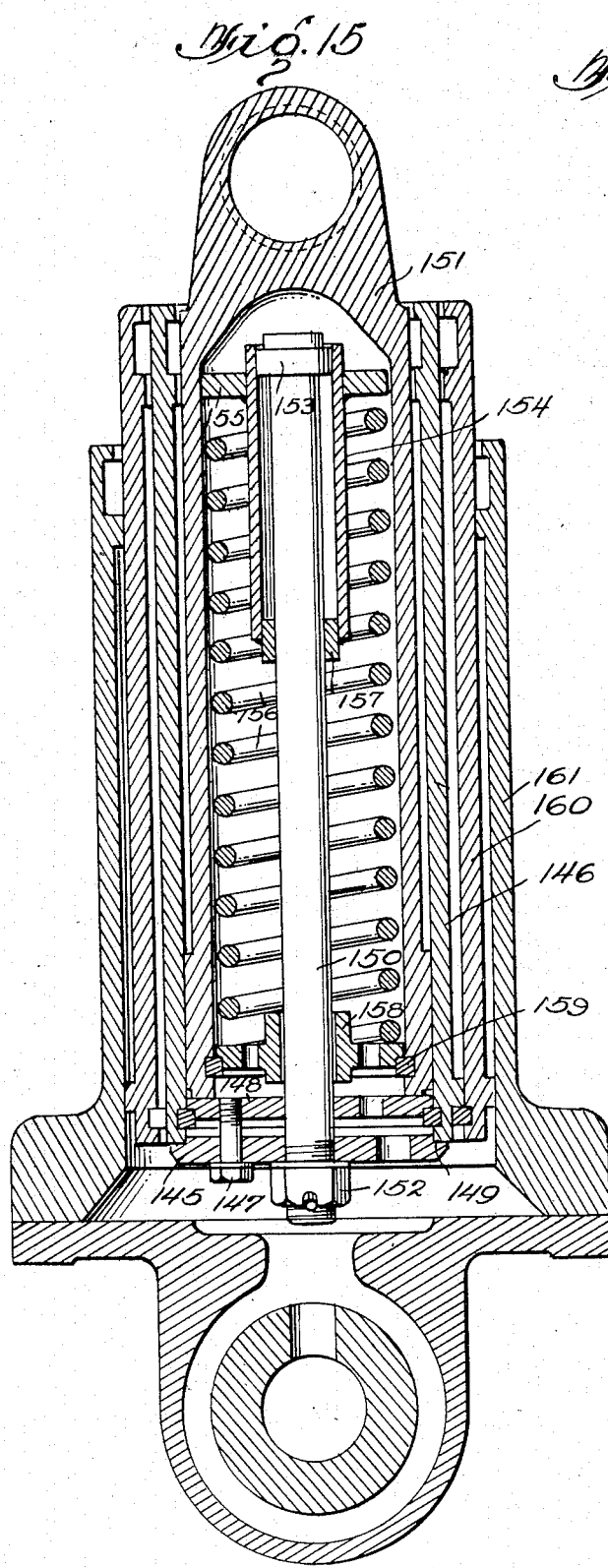
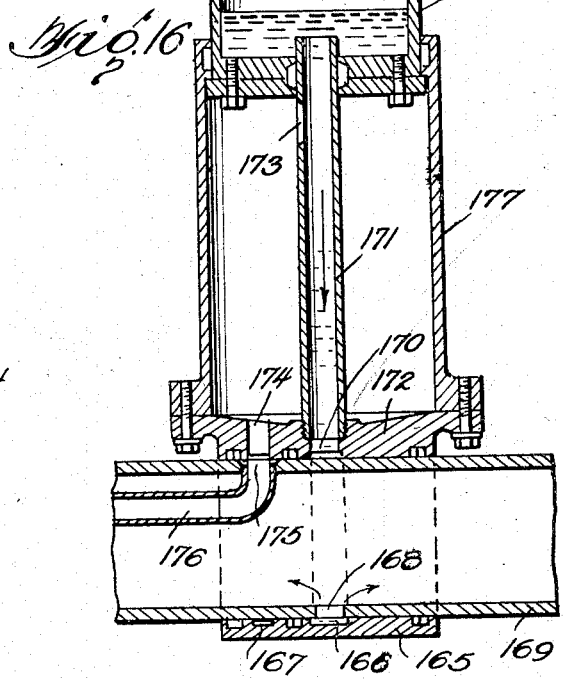
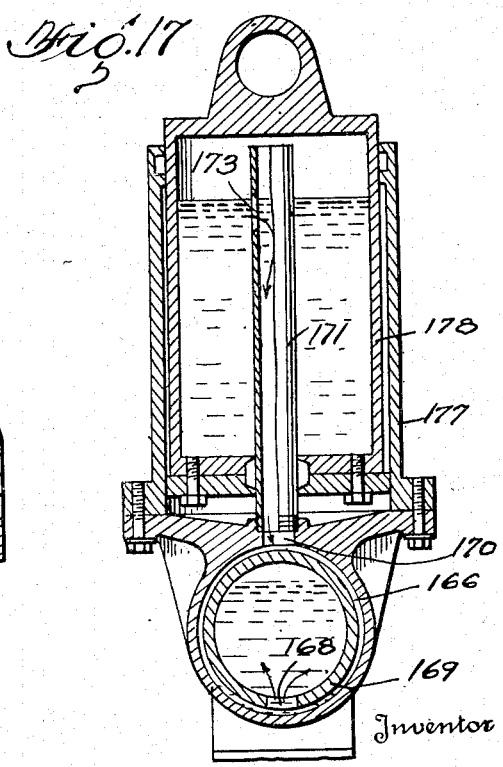

Jan. 21, 1941.  C. P. GALANOT  2,229,561
HYDRAULIC APPARATUS FOR MOTOR VEHICLES
Filed July 14, 1938  8 Sheets-Sheet 8
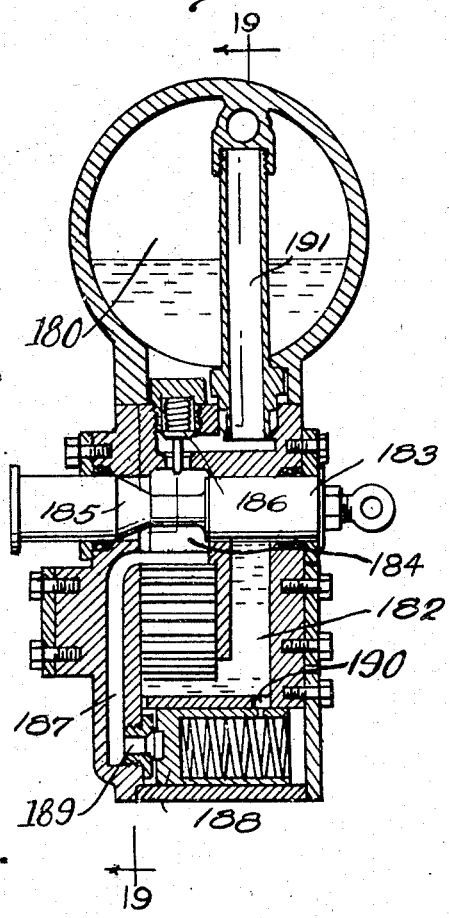
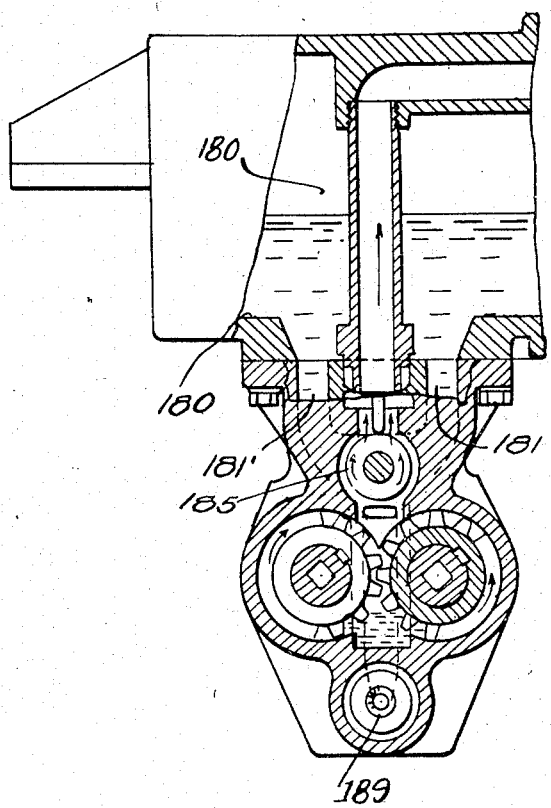
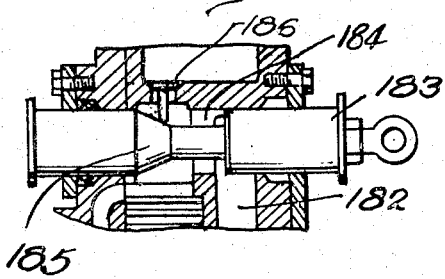
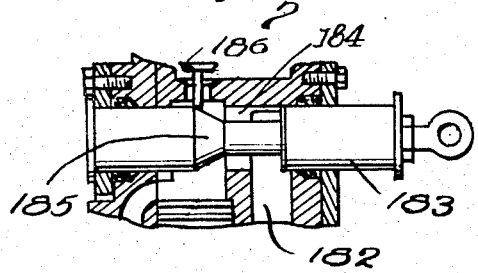
Inventor
Camille P. Galanot
By Watson Cole Grindle + Watson
Attorneys Patented Jan. 21, 1941

2,229,561

UNITED STATES PATENT OFFICE 2,229,561

HYDRAULIC APPARATUS FOR MOTOR VEHICLES

Camille P. Galanot, Cleveland, Ohio, assignor to The Galanot Products Company, Alliance, Ohio, a corporation of Ohio Application July 14, 1938, Serial No. 219,289

4 Claims. (Cl. 298—22)

This invention relates to motor vehicles provided with dump bodies and/or other equipment operated by hydraulic means, and more particularly to so-called dump trucks having bodies pivotally mounted on the vehicle frame at the rear end or one or both sides thereof and provided with a hydraulic jack adapted to raise and lower the body as desired.

A general object of the present invention is the provision of novel and improved hydraulic apparatus for vehicles of the type mentioned, which apparatus is especially rugged in construction, and is provided with safeguards against leakage, so that the apparatus is adapted to be used for long periods without replenishment of the operating fluid.

A further object of the present invention is the provision of hydraulic hoist apparatus in which the reservoir for the operating fluid is employed as a strengthening member of the vehicle frame and also as a support for the hydraulic jack.

A further object is the provision of a hoist apparatus embodying a novel mode of mounting the jack upon its supporting frame member, such that the communication between the jack and its associated reservoir, pump, and valves is accomplished by internal conduit means, there being no exposed conduits or flexible conduits required.

Another object of the present invention is the provision of a novel operating valve for use in connection with hydraulic apparatus of the type in question.

A further object is the provision of valve means including a check valve which opens to admit operating fluid into the fluid operated mechanism, closes automatically when the flow of fluid into the mechanism ceases, and is automatically and positively opened when the operating valve is placed in pressure-relieving position.

Another object of the present invention is the provision, in a hydraulic apparatus of the type mentioned, of a novel pressure operated relief valve for by-passing the operating fluid from the high presssure side of the pump to the low pressure side or to the reservoir when the fluid pressure exceeds a predetermined value, said valve being so constructed and arranged that the fluid is by-passed at a very low pressure after the valve is once opened.

An additional object is the provision of a novel form of hydraulic jack having automatic relief means by which the necessity of a pressure-operated relief valve may be avoided.

Another object is the provision, in hydraulic hoist apparatus of the type mentioned, of novel valve means including means for operating auxiliary hydraulic equipment simultaneously with the operation of the hoist jack.

A further object is the provision of novel valve means by which auxiliary hydraulic equipment may be operated simultaneously with but independently of the hydraulic hoist jack.

A further object is the provision of a novel unitary arrangement of fluid reservoir, hoist jack, pump and valves.

Another object is the provision of a novel pump construction for use in connection with hydraulic apparatus of the type mentioned, by which the useful life of the pump is prolonged by the substantial elimination of end thrust.

Another object is the provision of a novel form of hydraulic jack including means for cushioning the end of the stroke of the jack, and for assisting the load in lowering the jack when the fluid pressure is relieved.

Other and further objects, features, and advantages of the present invention will be more apparent to those skilled in the art upon a consideration of the following specification and accompanying drawings in which—

Figure 1 is a phantom side elevation of a motor vehicle embodying the novel hydraulic hoist apparatus of the present invention;

Figure 2 is a transverse section through the vehicle frame just forward of the hoist apparatus, illustrating the mode of support of the latter on the vehicle frame and showing the hoist apparatus in front elevation;

Figure 3 is an enlarged detail view partly in section illustrating the mode of support of the operating fluid reservoir on the vehicle frame;

Figure 4 is a side elevation of the hoist apparatus, partly broken away to illustrate the novel relief valve of the present invention;

Figure 5 is a fragmentary section, on line 5—5 of Figure 2;

Figure 6 is a section on line 6—6 of Figure 5;

Figure 7 is a section on line 7—7 of Figure 2;

Figure 8 is a section on line 8—8 of Figure 7;

Figures 9, 10 and 11 are vertical sectional views of the operating valve of Figure 7, shown in holding, raising and lowering positions, respectively;

Figure 12 is a vertical section on the plane of Figure 8, illustrating a modification in which two control valves are employed, the second valve being associated with auxiliary hydraulic equipment;

Figure 13 is a view similar to Figure 2, illustrating a modification of the present invention in which two hoist jacks are employed, one of such jacks being shown in vertical section;

Figure 14 is a vertical section illustrating a modified form of jack mounting;

Figure 15 is a vertical section illustrating a modified form of jack;

Figure 16 is a vertical section illustrating a modified form of jack and jack mounting, the jack being shown in extended position;

Figure 17 is a view similar to Figure 16 but showing the jack in telescoped or collapsed position;

Figure 18 is a vertical section, taken longitudinally of the vehicle, showing a modification in the pump and valve arrangement;

Figure 19 is a section on line 19—19 of Figure 18;

Figure 20 is a fragmentary view similar to Figure 18 and illustrating the control valve in neutral position; and Figure 21 is a fragmentary view similar to Figure 18 and illustrating the control valve in lowering position.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring first to the form of apparatus illustrated in Figures 1 to 11, in Figure 1 there is illustrated a motor vehicle having a hydraulically operating pump body designated by the numeral 1. The body 1 is pivoted as at 2 to the rear end of the vehicle frame comprising side frame members 3 and 4 (Figure 2), and is adapted to be supported at its forward end, when in lowered position, upon a cross member extending between two upright supports 5 secured to the respective side frame members. The vehicle may be provided with the usual operator's cab 6, and with the usual power plant 7 disposed at the forward end of the vehicle frame. The construction thus far described is conventional, and its details form no part of the present invention.

Secured between the side frame members 3 and 4 intermediate the respective ends of the body 1 is a member 8 which comprises a combination cross frame member and fluid reservoir, and also serves as a support for the hydraulic jack to be described. The member 8 has a hollow interior, serving as a reservoir, which may be filled to the desired level with an operating fluid, for example oil, through an opening normally closed by a threaded plug 9. The member 8 is preferably of such a length as to fit exactly between the side frame members 3 and 4, to which it may be bolted or otherwise suitably secured, but may be made in a standard length and adapted to vehicle frames of varying widths by the use of adapters as illustrated in Figure 3. In this instance, an adapter 10 is bolted to the inner side of each respective side frame member, the adapter being formed with a recess 11 for the reception of a plug 12 which is threaded into the adjacent end of the member 8. The plug 12, when used with an adapter 10 may be either solid or in the form of a hollow ring, but when no adapter is used the plug 12 obviously must be solid, so as to close the end of the member 8, and render it fluid-tight.

Mounted beneath the member 8 is a pump 13, which is adapted to be driven through a shaft 14 from a suitable power take-off 15 which is in turn driven by the power plant 7 of the vehicle, the connection between the shaft 14 and power take-off 15 being manually controlled from the operator's cab by means of a lever 16. The details of the power take-off and its connection to the shaft 14 form no part of the present invention and need not be further described.

A fluid operated telescoping jack 17 is mounted centrally of the member 8 in a manner to be later described, and is pivotally connected at its outer end as at 18 to the frame of the body 1. Mounted on the member 8, adjacent the jack 17, is a valve casing 19 containing control valve means and an automatic check valve to be later described. The control valve may be manually operated from the operator's cab by means of a hand lever 20, rod 21, rocker arm 22, and link 23. This operating means may be duplicated in case two control valves are employed, as later described.

Referring now to Figures 4, 5 and 6, the cross frame member 8, which also comprises the fluid reservoir is provided with a cylindrical journal portion on which the jack 17 is mounted for angular movement in a plane perpendicular to the axis of the member 8. The jack 17 comprises a collar 25 having an integral disc portion 26 to which the outer sleeve 27 of the jack is bolted. An inner sleeve 28 is slidably mounted within the sleeve 27 for telescoping movement relative thereto, suitable packing rings 29 being provided to prevent the escape of liquid between the respective sleeves. A hollow plunger 30 is slidably mounted within the sleeve 28 and is provided at its outer end with an integral boss 31 for connection to the underframe of the vehicle body 1. Suitable packing is employed between the inner sleeve 28 and the plunger 30.

The collar 25 is provided with a central annular recess 32 forming a channel encircling the member 8 and communicating with a central orifice 33 formed in the disc portion 26 and thus with the interior of the plunger 30. On the interior of the member 8 there is provided a conduit 34 communicating with an orifice 35 in the member 8 which in turn communicates with the annular recess 32 of the collar 25. The conduit 34 is thus in communication with the interior of the plunger 30 at all times, regardless of the angular position of the jack relative to the member 8, the operating fluid thus being conducted into the jack entirely through internal conduit means, eliminating the usual flexible conduit employed for this purpose. Suitable packing rings 36 are provided adjacent the lateral edges of the collar 25 to prevent the escape of operating fluid between the latter and the member 8.

As best seen in Figure 8, the conduit 34 extends longitudinally of the member 8 and thence upwardly, communicating with an orifice 37 in the upper surface of the member 8. The valve casing 19, secured to the upper surface of the member 8, is provided with a conduit 38 communicating with the orifice 37 and thus with the conduit 34. The valve casing 19 is likewise provided with an inlet port 39 (Figure 7), a return port 40 and a pair of by-pass ports 41, 41' which register, respectively, with corresponding orifices in the upper surface of the member 8. The orifice 40' which registers with the return port 40 of the valve casing, communicates directly with the reservoir comprised in the interior of the member 8. The inlet port 39 communicates with a conduit 42 which extends downwardly through the member 8 to the high pressure side of the pump 13. A conduit 43, branching from the conduit 42 near its upper end, communicates with the by-pass port 41' of the valve casing 19. Each of the said ports 39, 40, 41 and 41' communicates with a cylindrical chamber 44 extending through the valve casing, in which a cylindrical member 45 is slidably mounted. Above the slide member 45 the casing 19 is provided with a conduit 46 in the form of an inverted U, the respective legs of which terminate in ports 47 and 48 communicating with the chamber 44 at points opposite the ports 39 and 40 respectively. The conduit 46 opens into a vertical passage 49 in which is located a check valve 50. The latter comprises a head 51 which is adapted to engage a correspondingly shaped seat member 52, thus closing the passage 49. The valve 50 is normally urged to closed position by a spring 53 under compression between the head 51 and a plug 54, and is provided with an operating stem 55 which extends downwardly into the chamber 44. The conduit 38 (Figure 8) communicates with the passage 49 and thus, when the check valve is open, with the U conduit 46. A horizontal passage 56 likewise communicates with the vertical passage 49, and terminates in an orifice 57 which, as illustrated, is normally closed by a plug 57'.

The slidable member 45 is formed with annular recesses 58 and 59 (Figure 7), and with an intermediate elongated recess 60, into which the valve operating stem 55 extends. The recess 60 is formed with an inclined surface 61 for camming the check valve 50 upwardly when the slide member 45 is moved to the left. A spring-pressed ball detent 62 is provided for engagement with the walls of the recess 59 when the valve is in neutral or holding position, as illustrated in Figure 7. At the left end of the slide member 45, as shown in Figure 7, there is illustrated the connection between the slide member and the link 23 (Figure 1) through which it is operated.

The several positions of the control valve are illustrated in Figures 9 to 11. Figure 9 shows the valve in neutral or holding position, in which both the inlet port 39 and the return port 40 are closed by the slide member 45. In this position of the valve, the operating fluid can flow neither in nor out of the jack 17, which will accordingly remain in the position which it occupies at the time when the valve is shifted to neutral position. It will be noted that in this position the recess 59 is in communication with the elongated by-pass ports 41, 41', the purpose of which will be presently explained.

In Figure 10 the slide member 45 is shown in jack-raising position. The recess 59 interconnects the inlet port 39 and the arm 47 of the U-conduit 46, thus permitting operating fluid under pressure to flow from the pump 19 through the conduit 42, inlet port 39, conduit 46, passage 49 (the check valve 50 being raised by the pressure of the fluid), conduits 38 and 34 and into the jack 17. The latter will be caused to extend, in the well known manner, tilting the vehicle body 1. In so doing, the jack is caused to oscillate through a relatively small angle about the member 8, but since it is in communication, through the above described means, with the conduit 34 regardless of the position of the jack, this angular movement of the latter does not interrupt the flow of pressure fluid.

Figure 11 illustrates the slide member 45 in jack lowering position. The recess 58 interconnects the arm 48 of the conduit 46 and the return port 40, and at the same time the cam surface 61, moving to the left, has elevated the check valve 50 against the pressure of the spring 53, thus opening a line of communication between the jack 17 and the fluid reservoir within the member 8. The fluid is thus caused to flow out of the jack, by reason of the load upon the latter, and into the reservoir. It will be noted that in the lowering position of the slide member 45 the recess 59 is in communication with the left-hand ends of the elongated by-pass ports 41, 41'.

The by-pass port 41, as illustrated in Figure 8, communicates with a conduit 63 disposed inside of the member 8, which in turn communicates with a conduit 64 provided in a block 65 secured to the member 8 adjacent the valve casing 19. The conduit 64 communicates with the interior of the member 8 through a suitable orifice 66 formed therein. Thus, when the valve member 45 is in neutral position or in jack-lowering position, and the pump is running, the high pressure fluid may be by-passed through the conduit 43, by-pass ports 41', 41, and conduits 63, 64 into the reservoir.

Figure 12 illustrates means by which a second valve casing 67 and associated valve means, similar to that already described, may replace the block 65 of Figure 8, thus providing for the independent operation of any desired auxiliary hydraulic equipment, conventionally indicated as a hydraulic cylinder 68.

In this case, the inlet port 69 of the second valve casing 67 communicates with the conduit 42 by means of a branch conduit 70. The valve casing 67 may be provided with all of the ports and conduits previously described in connection with the valve casing 19, the conduit corresponding to the conduit 38 of the valve casing 19 being closed at its lower end by the surface of the member 8, or this conduit may be omitted. The hydraulic cylinder 68 is connected by a conduit 71 with the orifice corresponding to the orifice 57 of the valve casing 19, the plug 57' (Figure 7) being removed.

The by-pass port 41 of the valve casing 19 is in communication with the by-pass port 72 of the valve casing 67, through the conduit 63, and the by-pass port 73 of the valve casing 67 communicates with the interior of the member 8 through the orifice 66. Thus, when the valve member 74 of the second valve is in lowering or neutral position, the by-pass port 41 of the first valve is connected through to the orifice 66. Therefore, when both of the valves are either in lowering or neutral position, the high pressure fluid in the conduit 42 is by-passed back to the reservoir, just as in the case when a single valve is used.

By virtue of the provision of a second valve casing 67 and its associated part, it will be apparent that the hydraulic cylinder 68 or other auxiliary hydraulic equipment may be controlled independently of the hydraulic jack 17, and vice versa. It should be noted that the high pressure conduit 42 is closed off from the reservoir whenever either valve is in raising position. Under these circumstances, however, if the pressure of the fluid becomes sufficiently high, it will be relieved by means of the automatic relief valve hereinafter described.

It will be apparent that if it is desired to operate an auxiliary hydraulic device in synchronism with the hoist jack 17, this may be accomplished by merely connecting said device to the orifice 57 of the valve casing 19. Similarly, if it is desired, to operate another hydraulic device in lieu of the hoist jack, as for example, when the vehicle is to be used as a snow plow, etc., such hydraulic apparatus may be connected to the orifice 57, and the connection between the conduits 34 and 38 interrupted by inserting a plug.

The relief valve referred to above is illustrated in Figure 4, and comprises a cylinder 80, preferably formed integrally with the member 8, and extending into the interior thereof and into communication with the high pressure conduit 42. The inner end of the cylinder is provided with a plug 81 having a central aperture 82 providing communication between the conduit 42 and the interior of the cylinder 80, and forming a valve seat for the valve member 83. The latter is slidably mounted within the cylinder 80 and is normally urged against the plug 81 by a spring 84. The outer end of the cylinder is closed by a cap 85 which provides an abutment for the spring 84. The cylinder is provided with a port 86 inwardly of the valve member 83 and a second port 87 outwardly of the valve member 83, both of said ports communicating directly with the reservoir within the member 8. The inner end of the valve member 83 has the form of a truncated cone, providing a relatively small primary pressure surface just sufficient to close the aperture 82 when the valve is seated. The conical surface of the valve member 83 comprises a secondary pressure surface, which is subjected to the pressure of the fluid in the conduit 42 as soon as the valve member 83 has been unseated. The spring 84 is so selected that the valve member 83 remains seated against the plug 81 until the pressure in the conduit 42 reaches a predetermined relatively high value, at least slightly in excess of that necessary to operate the hydraulic jack and auxiliary hydraulic equipment. When the pressure in the conduit 42 reaches the predetermined limit, the valve member 83 is unseated, exposing the relatively large secondary pressure surface to the pressure of the fluid in the conduit 42, which now flows in through the aperture 82 and out through the port 86 into the reservoir. Since the secondary pressure surface is many times greater in area than the primary pressure surface, it is apparent that the valve 83 will remain unseated so long as the pressure in the conduit 42 exceeds a predetermined relatively low value. Therefore, when the jack 17, for example, has reached the limit of its stroke and the pump continues to run, if the operator fails to shift the operating valve to neutral position, no harm will be done since the above described relief valve will be promptly actuated as soon as an excessive pressure is developed in the conduit 42, after which the high pressure fluid from the pump will be by-passed, at a relatively low pressure, to the reservoir. The port 87, providing communication between the interior of the cylinder 80 and the reservoir, prevents the building up of any back pressure on the valve member 83.

The details of the pump 13 are illustrated in Figures 7 and 8. The pump comprises a casing 90 secured on the underside of the member 8 as by bolts 91 and communicating with the reservoir within the member 8 through a port 92. The casing 90 is also in communication with the conduit 42 through a port 93. The casing 90 comprises two oppositely formed outer sections 88 and 89 and a central section 90', which may be secured together, as by bolts 94, to form internally thereof a low pressure conduit 95 communicating with the port 92 and a high pressure conduit 96 communicating with the port 93. The respective outer sections 88 and 89 of the pump casing 90 are each provided with a pair of laterally extending cylindrical portions for the reception of bearing sleeves 97, the said cylindrical portions of the casing members being closed by threaded caps 98, except that in one instance a sleeve 98' is employed instead of a cap, in order to provide for a driving connection, as later described. In each opposed pair of bearing sleeves 97 there is journalled a shaft 99 having a spur gear 100 keyed thereon. One end of the upper or driven shaft 99 is provided with a projecting tongue 101, for a purpose later described, and for the sake of interchangeability, it is desirable to form the other shaft ends in a similar manner. The annular flanges 97' of the bearing sleeves 97 serve as wear plates for the teeth of the gears 100.

The sleeve 98' carries a bearing liner 102 in which is journalled a short shaft 103. The latter is provided at its outer end with a reduced portion 104 to which may be keyed the universal coupling 14' (Figure 1) which is in turn connected to the drive shaft 14. The inner end of the shaft 103 is provided with a transverse slot for the reception of the tongue 101 formed on the adjacent end of the shaft 99, thus forming a bayonet connection between the shaft 99 and the shaft 103. The provision of a certain amount of axial play in the said bayonet connection prevents the transmission of end thrust between the shaft 103 and the shaft 99. The shaft 103 is retained in its bearing by means of an annular shoulder 105 which overlaps the inner end of the bearing liner 102, the latter being in turn retained by reason of an annular shoulder 106 formed internally of the sleeve 98'. A packing gland 107 is provided in order to prevent the escape of operating fluid past the shaft 103.

By virtue of the described construction it is apparent that the shaft 103 may be connected to either end of either shaft 99, providing for obtaining a proper direction of rotation of the gears regardless of the location and position of the pump. If desired, the bearing sleeves 97 may be replaced by ball or roller bearings, in which case it is preferred to provide wear plates of equivalent shape and function to replace the flanges 97' of the sleeves 97.

Apart from the foregoing details, the pump 13 functions in a conventional manner. Fluid from the reservoir in the member 8 fills the low pressure conduit 95 and is carried around by the rotation of the gears 100 in the direction indicated in Figure 8, to the high pressure side of the pump. There, by reason of the intermeshing of the teeth of the respective gears, the fluid is forced from the grooves between the teeth, up through the conduit 96 and port 93 to the conduit 42. Preferably a drainage outlet 108 is provided as illustrated in Figure 8, since the pump is the lowermost element of the fluid system.

Figure 13 illustrates a modification of the present invention in which the hydraulic jack or jacks are mounted on a cross member which serves as a fluid conduit, but in which a separate reservoir is provided, the operating valve or valves and the pump being mounted on the reservoir. Thus, referring to Figure 13 the jacks 120, 121 are mounted on a tubular cross-member 122 which is secured between the side frame members of the vehicle as before, and serves as a cross frame member as well as a fluid conduit and a support for the jacks. The jack 120 is provided with a collar 123 of a size suitable to be journalled on the tubular member 122. As before, the collar 123 is provided with an annular channel 124 communicating at 125 with the interior of the jack. The tubular member 122 is provided with a port 126 which likewise communicates with the channel 124. The hollow interior of the member 122 is in communication with the valve casing 127 through port 128 and conduit 129. The valve casing 127 is mounted on a fluid reservoir 130 which may be secured to the vehicle frame at any convenient point and in any suitable manner. If desired, a second valve casing 131 may be mounted adjacent the valve casing 127, for cooperation therewith in the manner described in connection with Figure 12. A pump 132, similar to that previously described, is mounted beneath the reservoir 130 and communicates, through conduits extending within the reservoir 130, with the valve casings 127 and 131 in the manner previously described.

In this embodiment a relief valve 133, similar to that described in connection with Figure 4. is located in the wall of the reservoir 130, as shown. The valve 127 controls the raising and lowering of the jacks 120, 121, while the valve 131 may be used for independently controlling any desired auxiliary hydraulic equipment.

Figure 14 illustrates a modified form of jack which is universally mounted on the cross member 122. In this case the collar 134 is not journalled directly on the tubular cross member 122, but is journalled on trunnions 135, 136 provided on a sleeve 137, which in turn is journalled on the cross member 122. The sleeve 137 is provided with an annular channel 138 which communicates with the conduit in the interior of the member 122 by means of a port 139. The sleeve 137 is likewise provided with conduits 140, 141 extending within the trunnion 136, which serve to provide communication between the annular channel 138 and a conduit 142 provided in the collar 134 and communicating with the interior of the jack. In this manner the jack is at all times in communication with the interior of the member 122, and is adapted for angular movement with respect to the latter, in a plane perpendicular to the axis of the member 122, and also for limited angular movement in a plane containing the axis of the member 122. Angular movement in the latter plane will be necessarily small, since movement in this direction cannot exceed the amount of play in the connections between the vehicle body and frame. Therefore, provision may be made for maintaining the conduits 141 and 142 in constant communication, by slightly widening one or the other in the direction of the relative movement therebetween.

Figure 15 illustrates a further modified form of jack adapted to be mounted on a tubular cross member in the manner heretofore described. The present jack differs from those previously described in the provision of resilient means connecting the inner sleeve and the plunger, thereby cushioning the end of the stroke of the latter and serving to initiate its telescoping movement when the control valve is moved to lowering position. Thus, the jack is provided with a disc 145 seated against the lower end of the inner sleeve 146 and held in place by means of bolts 147, by which it is secured to a second disc 148, the latter being retained within the sleeve 146 by means of a retaining ring 149. A tie rod 150, threaded into the disc 145, extends upwardly through the disc 148 and within the plunger 151, and is provided at its lower end with a lock nut 152. The rod 150 is provided adjacent its upper end with an annular projection 153 which has a sliding engagement in a sleeve 154. The latter is provided with an annular flange 155 which rests upon a helical spring 156. The sleeve 154 carries a stop member 157 at its lower end, serving as an abutment for the annular projection 153 when the plunger is raised as will hereinafter be described. The spring 156 is carried on a spring support 158 which has a sliding engagement with the rod 150 and is retained against downward movement by a retaining ring 159.

Assuming that the jack has been raised to such an extent that the inner sleeve 146 is fully extended in the middle sleeve 160 and the latter fully extended in the outer sleeve 161, the pressure of the operating fluid will force the plunger 151 upwardly within the inner sleeve 146. As this occurs the spring support 158, spring 156 and sleeve 154 move outwardly with respect to the rod 150 until the stop member 157 comes in contact with the annular projection 153, halting the outward movement of the sleeve 154. The succeeding outward movement of the plunger 151 will thus serve to compress the spring 156 between the annular flange 155 of the sleeve 154 and the spring supporting member 158, thus cushioning the latter end of the stroke of the plunger. When the pressure within the plunger is relieved by moving the operating valve to lowering position, the spring 156 will assist the load on the plunger in initiating the telescoping movement of the latter into the sleeve 146.

It will be noted that the jack just described, like that of Figure 13, comprises three sleeves and a plunger, but any suitable number of sleeves may be employed.

Figures 16 and 17 illustrate a modified form of jack embodying automatic relief means, making it unnecessary to employ a relief valve, such as that hereinbefore described. Referring to Figure 16 it will be noted that the collar 165 is provided with two annular channels 166, 167. The channel 166 communicates through a port 168 with the interior of the tubular cross member 169 which, in the embodiment illustrated, serves as the fluid reservoir, as described in connection with Figure 2, for example. The channel 166 likewise communicates through a port 170 with a standpipe 171 threaded into the disc portion 172 of the jack collar. The standpipe 171 is open at its upper end, and is provided, a slight distance below its upper end, with a port 173.

The channel 167 communicates with a port 174 extending through the disc portion 172, and likewise communicates through a port 175 with the high pressure conduit 176 from the control valve, not shown.

The jack, in this instance, comprises the single sleeve 177 and a plunger 178 slidably mounted therein, the latter being provided centrally of its lower end with an aperture for sliding engagement with the standpipe 171, suitable packing being provided to prevent leakage of fluid past the outer surface of the standpipe.

In this embodiment the plunger 178 serves as an auxiliary fluid reservoir, in the following manner. When the plunger is in lowered position, it is occupied by operating fluid up to the level of the lower edge of the port 173. As the plunger is raised by the pressure of fluid flowing through the port 174 from the conduit 176, the fluid within the plunger flows through the port 173 and down through the standpipe 171, annular channel 166 and port 168 into the reservoir in the cross member 169, where it is available to feed the pump, not shown. When the plunger 178 reaches its fully extended position, the port 173 in the standpipe is opened to the interior of the sleeve 177 and the fluid under pressure, if the pump continues to run, then flows in through the port 173, down through the standpipe, and into the reservoir as previously described. The pressure fluid is thus automatically by-passed to the reservoir, when the jack is in fully extended position. If the control valve is now placed in holding position and the pump stopped, the plunger 178 will settle down until the port 173 is closed off from the interior of the sleeve 177, thus preventing further flow of fluid from the sleeve into the standpipe. When the control valve is placed in lowering position, permitting the fluid within the sleeve 177 to flow out through the port 174 and conduit 176, the plunger telescopes within the sleeve 177 by reason of the load upon it. As it does so, the excess fluid which passes into the reservoir in the cross member 169, after the capacity of the reservoir has been reached, is forced up through the standpipe into the plunger.

It is apparent that this construction not only eliminates a separate relief valve but permits the use of a cross member of lesser cross section, since the reservoir provided in the cross member need not be large enough to contain the entire quantity of operating fluid.

Figures 18 to 21 illustrate a further modification of the present invention, in which the pump, control valve and relief valve are united in a single casing, which is mounted beneath the hollow cross member which forms the fluid reservoir. In this modification, the pump is mechanically similar to that previously described and is fed from the reservoir 180 through conduits 181, 181', which merge into a single conduit 182 communicating with the low pressure side of the pump gears. A valve member 183 is slidably mounted in a cylindrical chamber 184, the latter being in communication with the high pressure side of the pump gears and also with the low pressure conduits 181, 181', 182. In this embodiment, the slidable valve member 183 is provided with a single relatively wide annular recess, one wall of which is tapered as at 185 for the purpose of operating the check valve 186. The high pressure side of the pump also communicates, through a conduit 187 with a two-stage pressure operated relief valve 188 similar to that previously described. The interior of the relief valve is in communication with the low pressure side of the pump through a port 189, a second port 190 being provided to prevent the building up of back pressure within the relief valve.

In Figure 18 the valve member 183 is shown in jack-raising position, the check valve 186 also being shown as raised by the pressure of the fluid flowing from the high pressure side of the pump through the recess in the valve member 183, past the check valve 186, and into the high pressure conduit 191. In this position of the valve member 183, the high pressure side of the pump is closed off from the low pressure conduits 181, 181', 182.

When the valve member 183 is moved into neutral or holding position as illustrated in Figure 20, the high and low pressure sides of the pump are connected through the annular recess of the member 183, by-passing the high pressure fluid and allowing the check valve 186 to close. The fluid operated device or devices are thus held in the position into which they have been moved by the high pressure fluid.

When the valve 183 is moved into lowering position as illustrated in Figure 21, the check valve 186 is positively elevated, as shown, being cammed up by the tapered surface 185 of the member 183. In this position, also, the high and low pressure sides of the pump are in communication, and the fluid flowing down through the conduit 191 and check valve 186 passes into the low pressure conduits 181, 181', and thence into the reservoir.

If fluid pressure on the high pressure side of the pump becomes excessive, for example after the jack is fully raised and the valve has not been moved to neutral, the excessive pressure will be communicated through the conduit 187 into the relief valve 188, which will be actuated as previously described, and will thereafter by-pass the fluid, at a relatively low pressure, to the reservoir.

Having thus described the invention, what is claimed as new and desired to be secured by Letters Patent is:

1. In a hydraulic apparatus for motor vehicles, a jack-supporting member having a journal portion of cylindrical form and having a fluid conduit therein, a fluid-operated jack mounted on said journal portion of said member for angular movement in a plane perpendicular to the axis of said member, the bearing surfaces of said jack and said member cooperating to form a channel encircling said member, said jack having an orifice communicating with said channel, and said member having an orifice communicating with said conduit and said channel, a pump adapted to force an operating fluid through said fluid conduit and into said jack, and valve means for controlling the flow of said fluid to and from said jack.

2. In a hydraulic apparatus for motor vehicles, a jack-supporting member having a journal portion of cylindrical form and having a hollow interior, a fluid-operated jack mounted on said journal portion of said member for angular movement in a plane perpendicular to the axis of said member, the bearing surfaces of said jack and said member cooperating to form a channel encircling said member, said jack having an orifice communicating with said channel, and said member having an orifice communicating with said channel, a pump, a conduit extending within said member and connecting said pump and said orifice in said member, and valve means between said pump and said orifice.

3. In a hydraulic apparatus for motor vehicles, a jack-supporting member having a journal portion of cylindrical form and having a hollow interior comprising a fluid reservoir, a fluid-operated jack mounted on said journal portion of said member for angular movement in a plane perpendicular to the axis of said member, the bearing surfaces of said jack and said member cooperating to form a channel encircling said member, said jack having an orifice communicating with said channel and said member having an orifice communicating with said channel, a pump supported beneath said member and adapted to draw operating fluid therefrom, conduit means connecting said pump and said orifice in said member, and valve means between said pump and said orifice.

4. In hydraulic apparatus for motor vehicles, in combination with a motor vehicle having a frame, a jack-supporting member mounted on said frame and having a hollow interior comprising a fluid conduit and having a cylindrical journal portion, a fluid-operated jack mounted on said journal portion of said member for angular movement in a plane perpendicular to the axis of said member, the bearing surfaces of said jack and said member cooperating to form a channel encircling said member, said jack and said member, respectively, having orifices communicating with said channel, a fluid reservoir mounted on said frame, a pump, a control valve, and conduit means connecting said reservoir, pump, valve and cross frame member.

CAMILLE P. GALANOT.